US010436112B2

(12) United States Patent
Hoisington et al.

(10) Patent No.: US 10,436,112 B2
(45) Date of Patent: Oct. 8, 2019

(54) TRANSLATING TURNING VANES FOR A NACELLE INLET

(71) Applicant: The Boeing Company, Chicago, IL (US)

(72) Inventors: Zachary C. Hoisington, Long Beach, CA (US); Francisco D. Palacios, Long Beach, CA (US); Drew C. Hoffman', Long Beach, CA (US); Andrew M. Dorsey, Long Beach, CA (US); Kevin J. Sequeira, Long Beach, CA (US); Romar C. Frazier, Long Beach, CA (US); Steven E. Chapel, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 15/633,579

(22) Filed: Jun. 26, 2017

(65) Prior Publication Data

US 2018/0371996 A1 Dec. 27, 2018

(51) Int. Cl.

| | |
|---|---|
| ***F02C 7/042*** | (2006.01) |
| ***F02C 7/057*** | (2006.01) |
| ***B64D 27/18*** | (2006.01) |
| ***B64D 29/06*** | (2006.01) |
| ***B64D 33/02*** | (2006.01) |
| ***F02K 3/06*** | (2006.01) |
| ***F02K 3/068*** | (2006.01) |
| ***F02C 7/04*** | (2006.01) |

(52) U.S. Cl.

CPC .............. *F02C 7/042* (2013.01); *B64D 27/18* (2013.01); *B64D 29/06* (2013.01); *B64D 33/02* (2013.01); *F02C 7/04* (2013.01); *F02C 7/057* (2013.01); *F02K 3/06* (2013.01); *F02K 3/068* (2013.01); *F05D 2250/511* (2013.01)

(58) Field of Classification Search

CPC .. F02C 7/042; F02C 7/04; F02C 7/057; F02K 3/068; F02K 3/06; B64D 27/18; B64D 29/00; B64D 29/06; B64D 33/02; F05D 2250/511

See application file for complete search history.

(56) References Cited

U.S. PATENT DOCUMENTS

| | | | | |
|---|---|---|---|---|
| 3,222,863 A * | 12/1965 | Klees | F02C 7/042 | 138/43 |
| 3,532,129 A | 10/1970 | Ward | | |
| 3,618,876 A * | 11/1971 | Skidmore | F02C 7/042 | 137/15.1 |
| 3,664,612 A * | 5/1972 | Skidmore et al. | B64D 33/02 | 137/15.1 |
| 3,883,095 A * | 5/1975 | Fletcher | B64C 21/02 | 137/15.1 |
| 4,804,155 A * | 2/1989 | Strumbos | B64C 25/423 | 244/12.6 |
| 4,865,268 A * | 9/1989 | Tracksdorf | B64D 33/02 | 244/53 B |

(Continued)

*Primary Examiner* — Grant Moubry

(74) *Attorney, Agent, or Firm* — Felix L. Fischer

(57) ABSTRACT

A flow control system on an aircraft engine nacelle incorporates a plurality of translating turning vanes each having a body. An equal plurality of actuators is coupled to a trailing edge of the body of an associated one of the translating turning vanes. The actuator translates the body from a retracted position to an extended position.

20 Claims, 16 Drawing Sheets

(56) References Cited

U.S. PATENT DOCUMENTS

| | | | | |
|---|---|---|---|---|
| 5,365,731 | A * | 11/1994 | Nikkanen | B64D 15/04 60/779 |
| 6,655,632 | B1 | 12/2003 | Gupta et al. | |
| 8,096,501 | B2 * | 1/2012 | Marche | F02K 1/72 239/265.29 |
| 8,402,739 | B2 * | 3/2013 | Jain | F04D 27/0253 137/15.1 |
| 8,408,491 | B2 * | 4/2013 | Jain | B64C 23/00 244/53 B |
| 9,133,789 | B2 * | 9/2015 | Vauchel | B64C 7/02 |
| 9,169,779 | B2 * | 10/2015 | Winter | F02C 7/042 |
| 9,255,546 | B2 * | 2/2016 | Welch | F02K 1/09 |
| 2005/0022866 | A1 * | 2/2005 | Sakurai | B64D 33/02 137/15.1 |
| 2008/0308684 | A1 | 12/2008 | Chaudhry | |
| 2009/0092482 | A1 | 4/2009 | Winter | |
| 2013/0228635 | A1 * | 9/2013 | Caruel | F02K 1/09 239/11 |
| 2016/0230702 | A1 * | 8/2016 | Charron | F02K 1/72 |
| 2016/0305370 | A1 * | 10/2016 | Smith | F02K 1/605 |

* cited by examiner 14
33
19
28
30
28
28
38
18
28
17a
20

TRANSLATING TURNING VANES FOR A NACELLE INLET

REFERENCE TO RELATED APPLICATIONS

This application is copending with application Ser. No. 15/633,523 entitled ROTATING DEVICES FOR MITIGATION OF ADVERSE FLOW CONDITIONS IN AN ULTRA-SHORT NACELLE INLET, filed substantially concurrently herewith and having a common assignee.

BACKGROUND INFORMATION

Field

Exemplary embodiments of the disclosure relate generally to aerodynamic flow control for turbofan aircraft nacelles and more particularly to translating turning vanes on the leading lip of ultra-short nacelles.

Background

Turbofan engines are widely employed for large commercial aircraft. As engines become larger and fans become wider, nacelles housing the fans must become shorter to achieve lower fuel burns. However, shorter nacelles, especially the resulting shorter inlets means that at adverse conditions such as high angles of attack or crosswind conditions the flow is more likely to separate behind the leading edge of the short inlet. The short inlet's smaller leading edge radius, and other features, makes it more difficult for flow to stay attached when airflow entering the engine must turn before heading in a direction approximately normal to the fan-face. If the flow separates at the leading-edge of the nacelle, the resulting distortion at the fan-face is undesirable. The separated flow may reduce performance, increase noise, and require heavier support structure to mitigate aerodynamically induced vibration. Existing solutions include simply making the inlet longer. Alternatively blow-in doors used earlier nacelle designs may be employed. However, making the inlet longer is not viable option in many applications as it reduces effectiveness of the larger engine by creating excess drag and weight. Blow-in doors increase emitted noise from aircraft operations and are structurally complex. It is therefore desirable to provide alternative solutions for inlet flow control which overcome the constraints of prior art solutions and provide improved performance.

SUMMARY

As disclosed herein a flow control system on an aircraft engine nacelle incorporates a cascade of translating turning vanes supported to extend from a leading edge of a nacelle. At least one actuator is coupled to the cascade of translating turning vanes to translate the cascade from a retracted position to an extended position.

The exemplary embodiments disclosed provide a method for inlet flow control on an ultra-short turbofan engine nacelle by extending a plurality of translating turning vanes on each engine nacelle in at least lower quadrants of an inlet circumference accommodating a high angle of attack of the nacelle.

BRIEF DESCRIPTION OF THE DRAWINGS

The features, functions, and advantages desired can be achieved independently in various exemplary embodiments of the present disclosure or may be combined in yet other embodiments, further details of which can be seen with reference to the following description and drawings.

DETAILED DESCRIPTION

The exemplary embodiments described herein provide translating multiple element turning vanes for adverse flow conditions in an ultra-short nacelle inlet to solve the problem of flow distortion on the fan face of the engine. The multiple element turning vanes are a deployable aerodynamic structure having a vane cascade with varying airfoil sections which are extended from the leading edge of the nacelle to decrease or eliminate flow separation from the inlet inner contour in off-nominal conditions such as crosswind and high angles of attack. The resulting variable geometry inlet deals with low speed and high angle of attack problems of separated flow, while still preserving the short nacelle by retracting into a recess in the nacelle leading edge to maintain cruise performance and the overall optimum performance of the larger engine.

Figure 1:
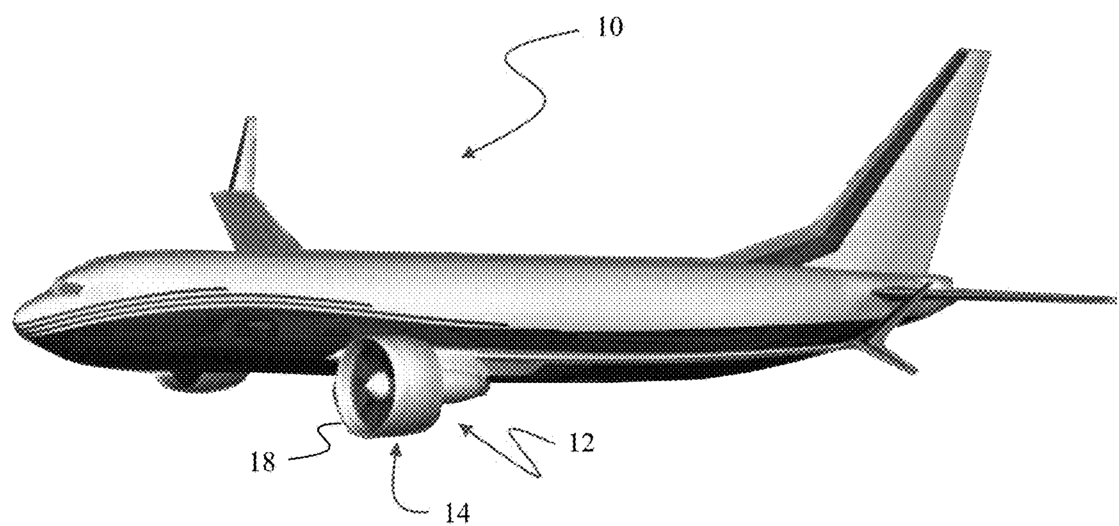
FIG. 1 is pictorial representation of a commercial aircraft with turbofan engines.
Figure 2A:
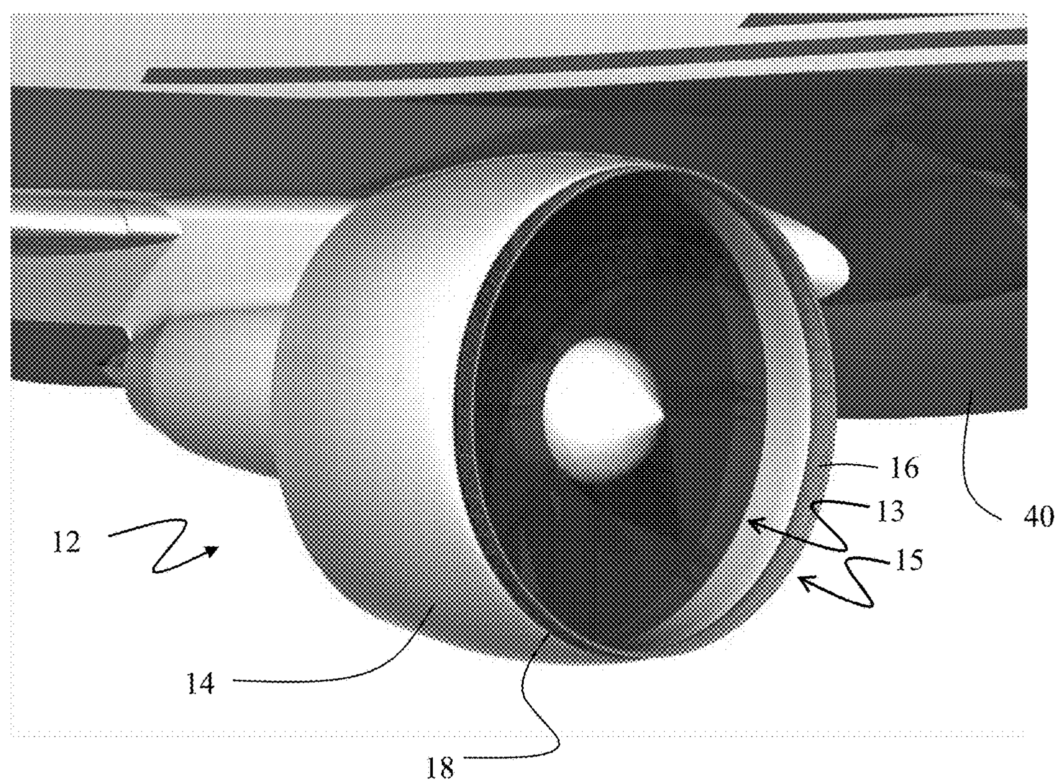
FIG. 2A is a pictorial detail of the turbofan engine nacelle as mounted on the aircraft wing with an exemplary embodiment of a cascade of translating turning vanes in the extended position.

Referring to the drawings, FIG. 1 depicts a large commercial aircraft 10 employing high bypass ratio turbofan engines 12 having ultra-short nacelles 14. A radial cascade 15 of translating turning vanes are configured to be deployed around a leading edge 18 of the nacelle 14 in translating turning vane segments 16 as seen in FIG. 2A. The leading edge 18 circumscribes an inlet 13 providing air flow into the nacelle 14 for the turbofan engine 12. The cascade 15 of extendible turning vanes translates to be positionable over a range from a stowed or retracted position as seen in FIGS. 3A-3D to the fully deployed or extended position seen in FIG. 2A and in detail in FIGS. 2B and 2C. The cascade 15 of extendible turning vanes provides a flow control system to reduce flow distortion in the inlet.

Each translating turning vane segment 16 has a nose vane 17*a*, and multiple trailing vanes 17*b*, 17*c*, 17*d* and 17*e* supported by longitudinal ribs 19. The nose vane 17*a* has an outer contour 20 matching the nose contour of the leading edge 18, whereby in the retracted position, laminar flow of the inlet may be substantially maintained. A closing vane 17*f* again has an outer contour 21 matching the contour of the leading edge 18 to provide a smooth aerodynamic transition with the translating turning vane segment 16 in the fully extended position aligning the closing vane 17*f* with the leading edge 18.

Figure 2B:
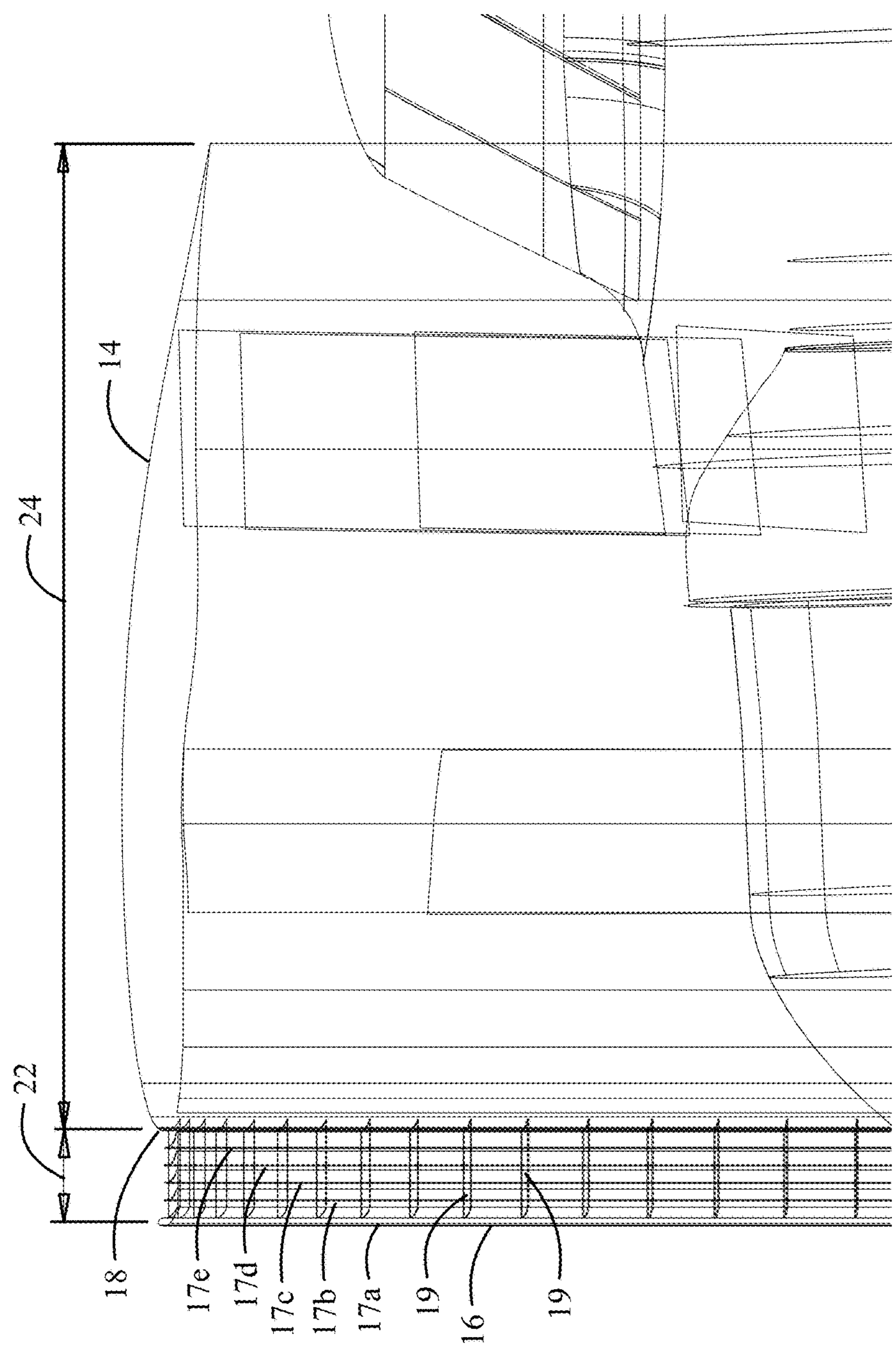
FIG. 2B is a partial section view of the nacelle with an exemplary embodiment of one translating turning vanes segment as deployed demonstrating relative sizing of the translating turning vane segment and nacelle.

While shown in the drawings as having a common shape, vanes 17*b*-17*e* may have differing airfoil shapes and chord for tailoring the aerodynamics of flow turning as required. As seen in FIG. 2B, the radial cascade 15 of extendable translating turning vane segments 16 has fully extended length 22 which is determined based on the number and spacing of vanes 17*a*-17*e* but is nominally 2.5-15% of the nacelle length 24. For the embodiment shown, the nose vane 17*a* and four additional vanes 17*b*-17*e* are used. In alternative embodiments between 2 and 10 vanes may be employed.

Figure 2C:
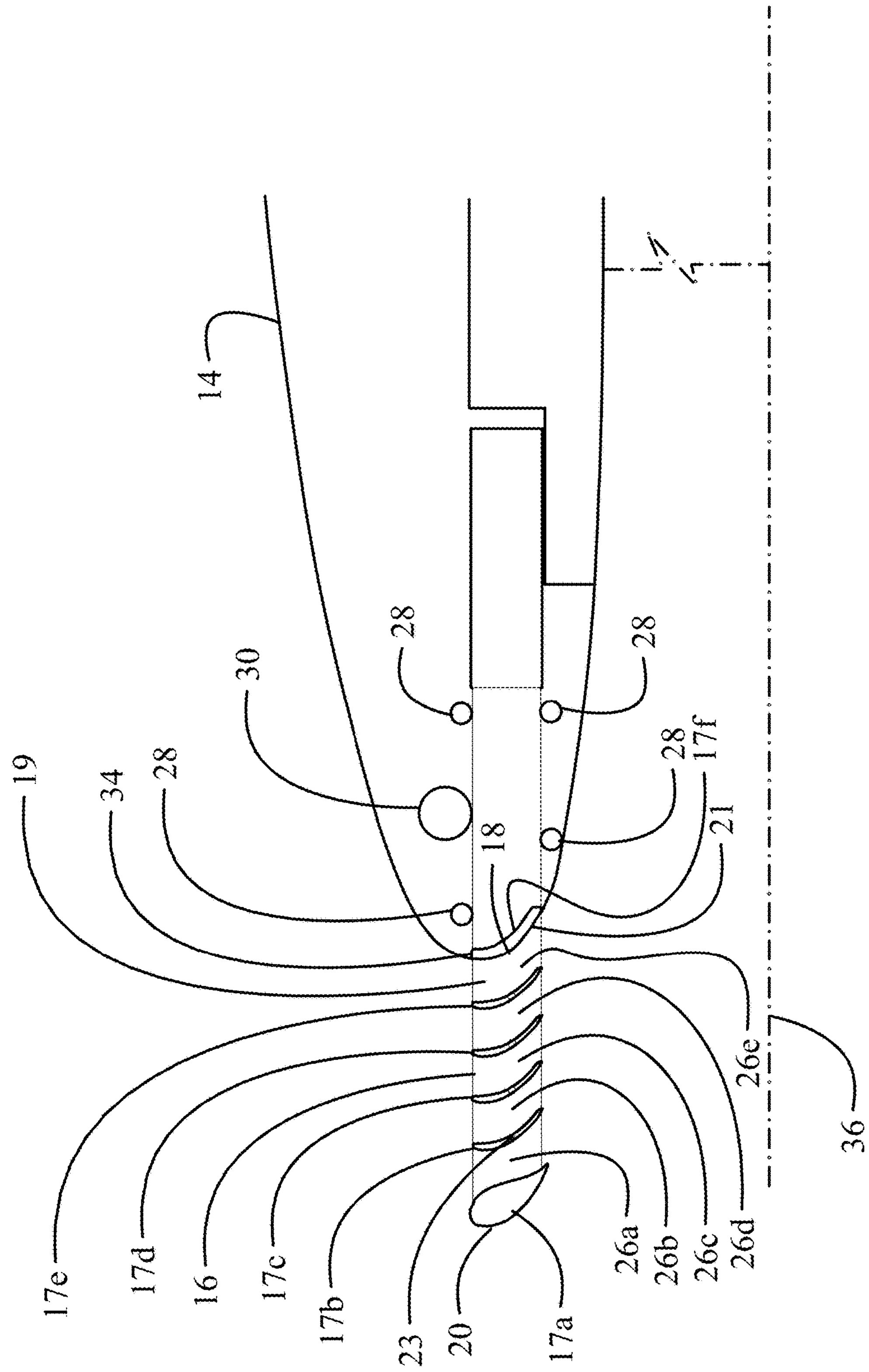
FIG. 2C is a first detailed side section view of the translating turning vanes segment in the deployed position.
Figure 2D:
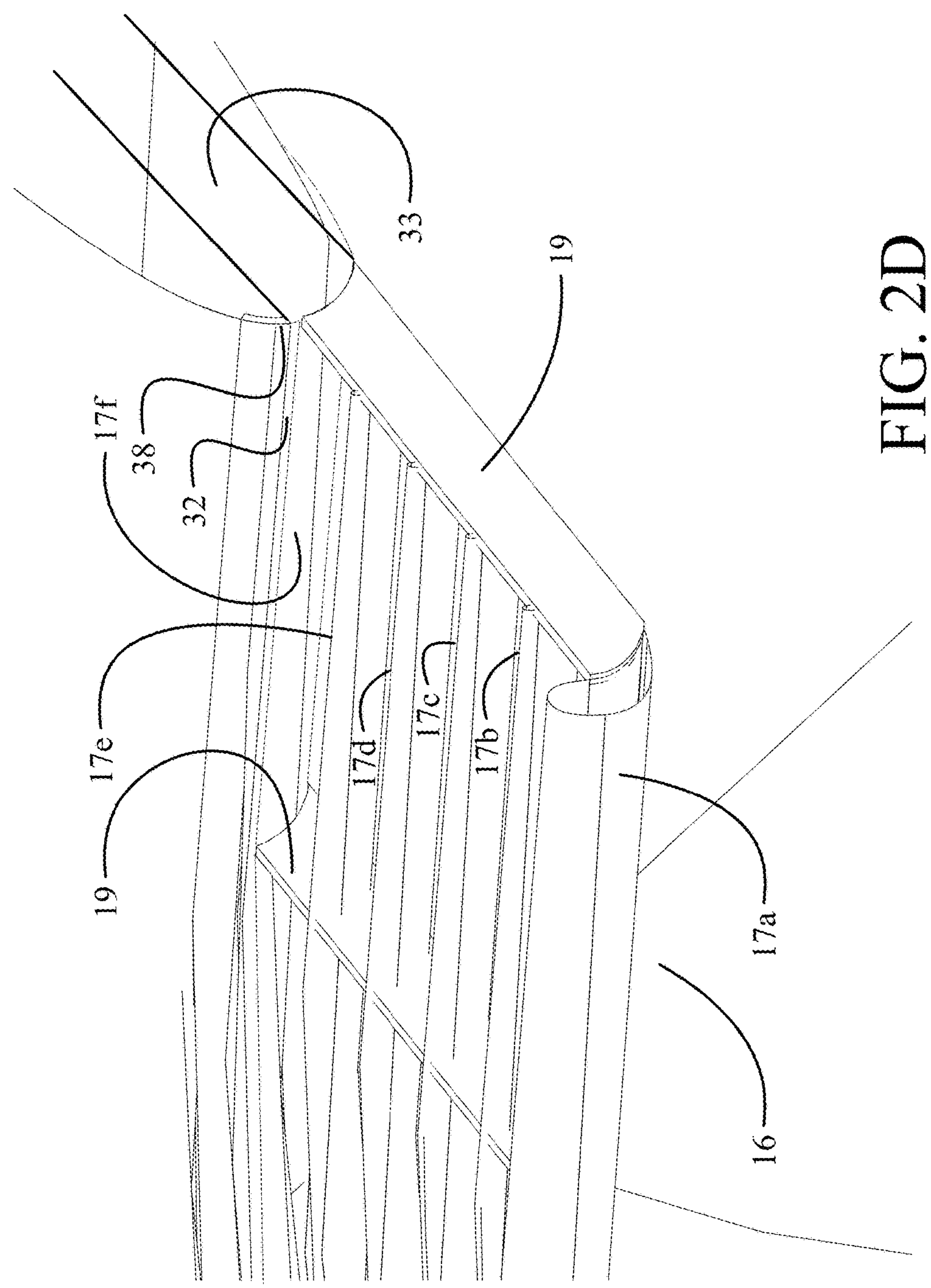
FIG. 2D is a second detailed upper angle pictorial view showing features of the translating turning vanes segment in the deployed position.
Figure 2E:
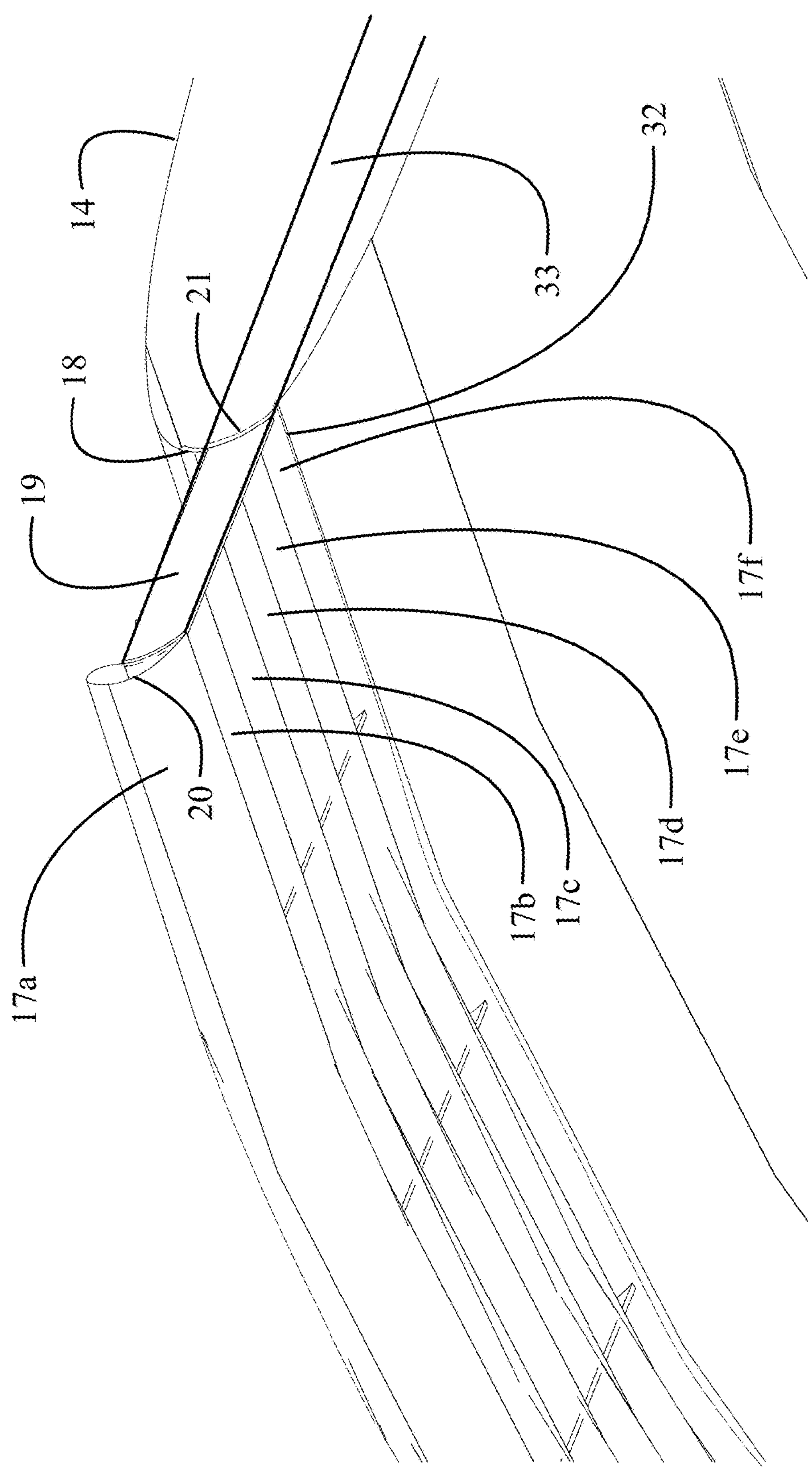
FIG. 2E is a third detailed lower angle pictorial view showing features of the translating turning vanes segment in the deployed position.

FIGS. 2D-2E show the translating turning vane segment 16 in alternate views for clarity. The entire radial cascade 15 may be a single element which is extended from the leading edge 18 as a unit or cartridge with a continuous nose vane 17*a*. Alternatively, the radial cascade 15 may be split into quadrants, individually operable to extend translating turning vane segments 16 or other desired segments spanning a portion of the circumference of the leading edge 18 for operational sequencing as will be described in greater detail subsequently. For simplicity in explanation, the description is provided herein in terms of an individual translating turning vane segment 16.

The ribs 19 support the vanes 17*a*-17*e* to provide spacing of flow channels or slots 26*a*-26*e* between the vanes. Deployment of the translating turning vane segments 16 increases the effective chord of the nacelle.

Figure 3A:
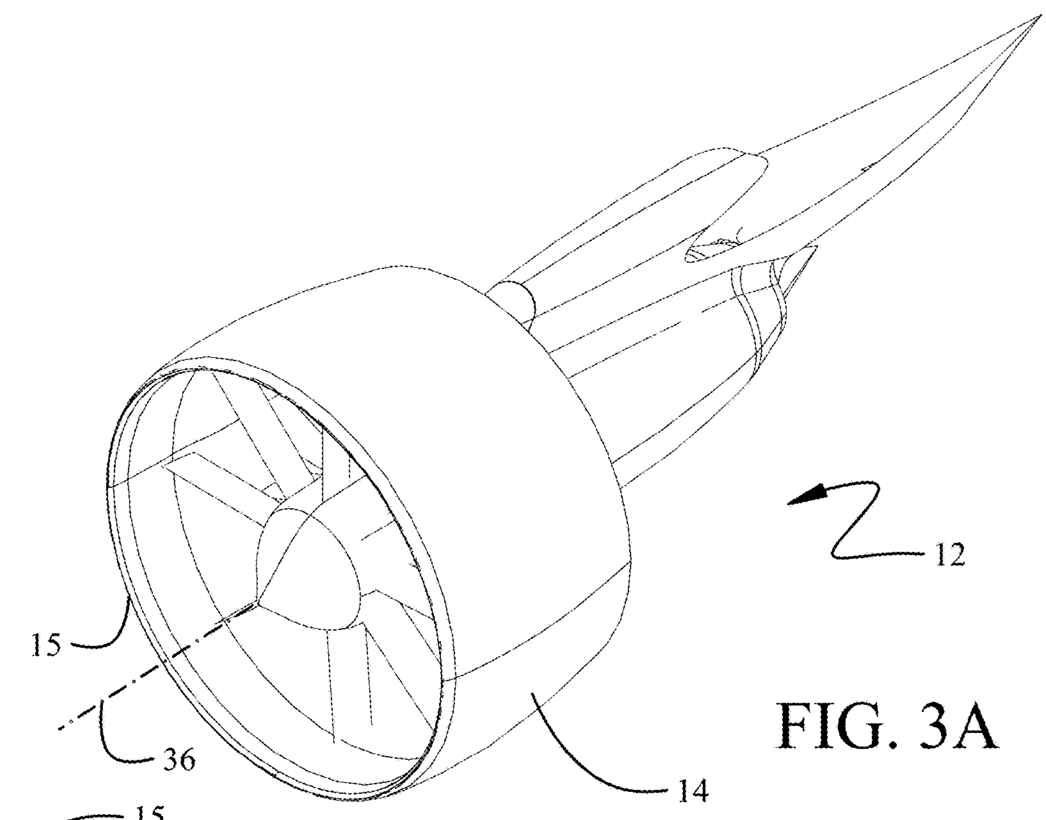
FIG. 3A is a front pictorial view of the inlet nacelle and engine with the cascade of translating turning vanes in the stowed or retracted position.
Figure 3B:
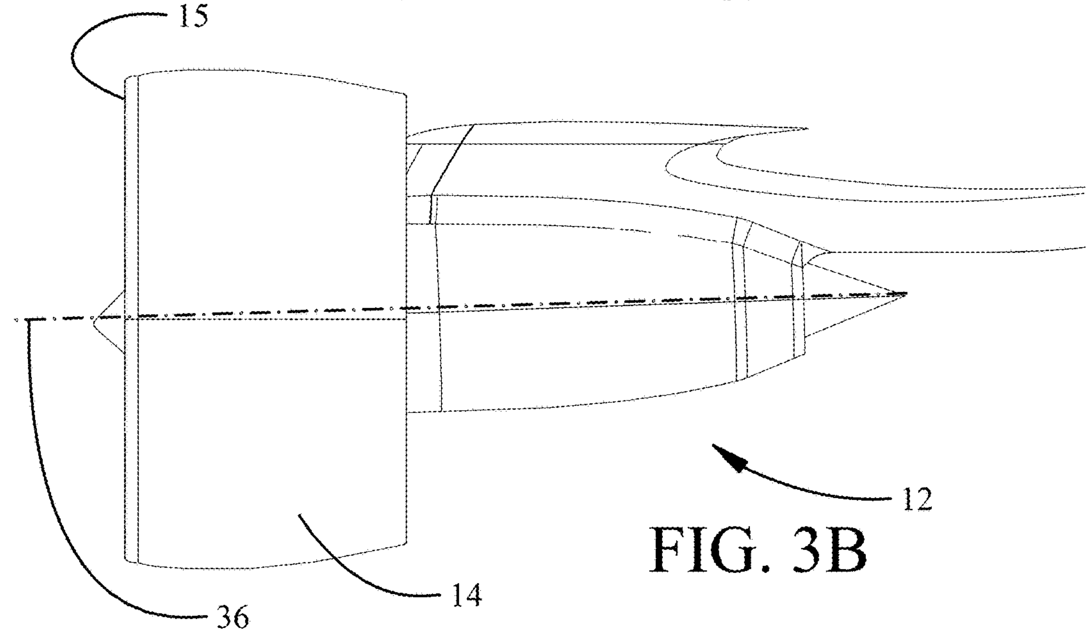
FIG. 3B is a side view of the nacelle and engine with the cascade of translating turning vanes in the stowed or retracted position.
Figure 3C:
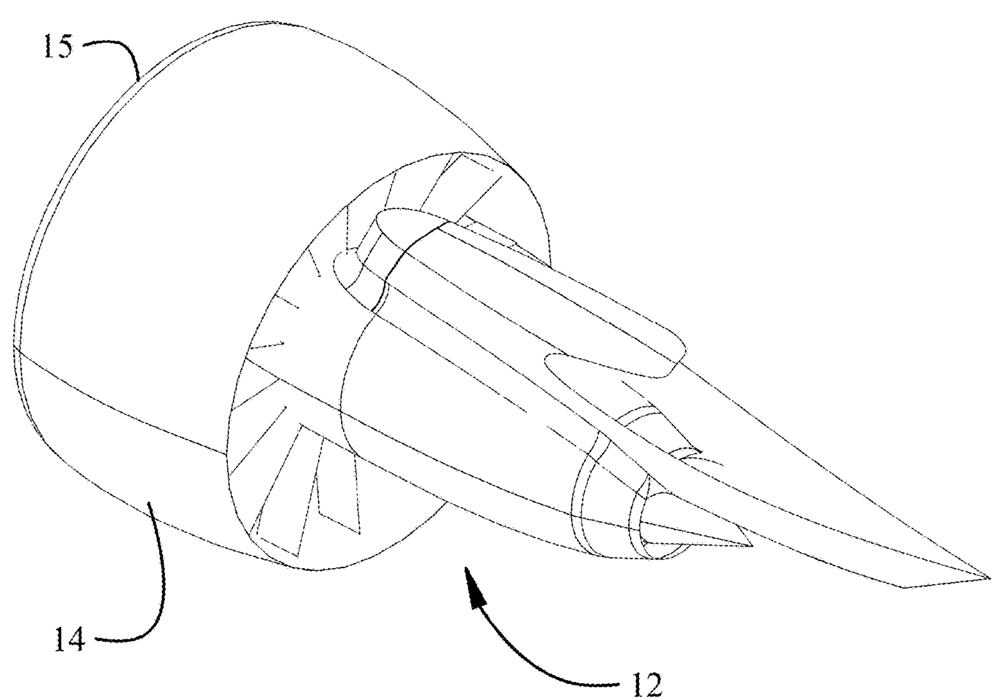
FIG. 3C is a rear pictorial view of the nacelle and engine with the cascade of translating turning vanes in the stowed or retracted position.
Figure 3D:
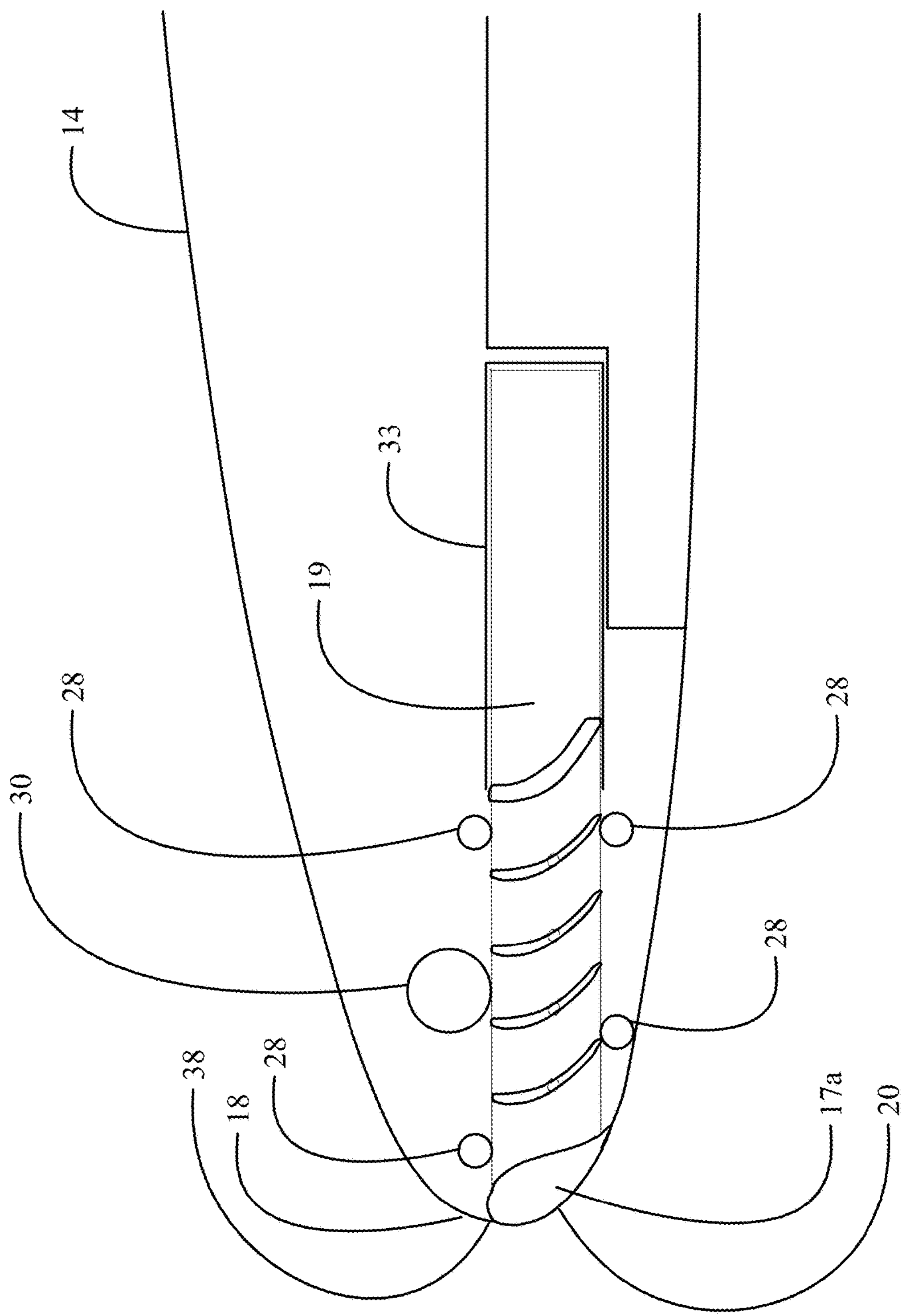
FIG. 3D is a detailed side section view showing features of the translating turning vanes segment in the stowed position.

As seen in FIGS. 2C and 3D, the ribs 19 are supported by a plurality of bearings 28 for longitudinal extension from and retraction into the nacelle 14. A plurality of actuators such as rollers 30, which may be pinion gears engaging a gear rack in the ribs 19, are engaged to extend or retract the translating turning vane segments 16 in the cascade 15. Stepper motors or similar devices may be employed to drive the pinion gears for precise extension length for partial and full extension. In alternative embodiments, linear actuators may be employed to extend and retract the translating turning vane segments 16. Depending on the selected configuration of the cascade 15 (a single cartridge, individual translating turning vane segments or partial circumferential segments) multiple vane segments 16 may be interconnected by mechanical or hydraulic linkages and the number of individual ribs or segments driven by separate actuators may vary. In certain embodiments a single actuator may be employed to extend the entire cascade 15. In certain embodiments, one or more of the vanes 17*a*-17*e* in the translating turning vane segments 16 may be rotatable about an axis 23 (represented in FIG. 2C).

For the embodiment shown, the outer extent of a slotted opening 32 in the leading edge 18 (best seen in FIGS. 2D and 2E), through which the cascade 15 is extended and retracted, has an outer edge 34 relative to a nacelle inlet centerline 36 (seen in FIG. 2C) substantially aligned with a nominal cruise condition stagnation point 38 on the nacelle leading edge 18. The cascade 15 is thus positioned radially inward from the stagnation point 38 to avoid interrupting flow on the exterior contour of the nacelle 14 for reduced drag at cruise. Matching of the outer contour 20 of the nose vane 17*a* to the contour of the leading edge of the nacelle reduces flow disruption on the internal surface of the inlet with the cascade 15 retracted for cruise conditions to minimize aerodynamic drag at cruise. The slotted opening 32 opens into a recess 33 in the nacelle 14 to house the cascade 15.

Figures 4A, 4B:
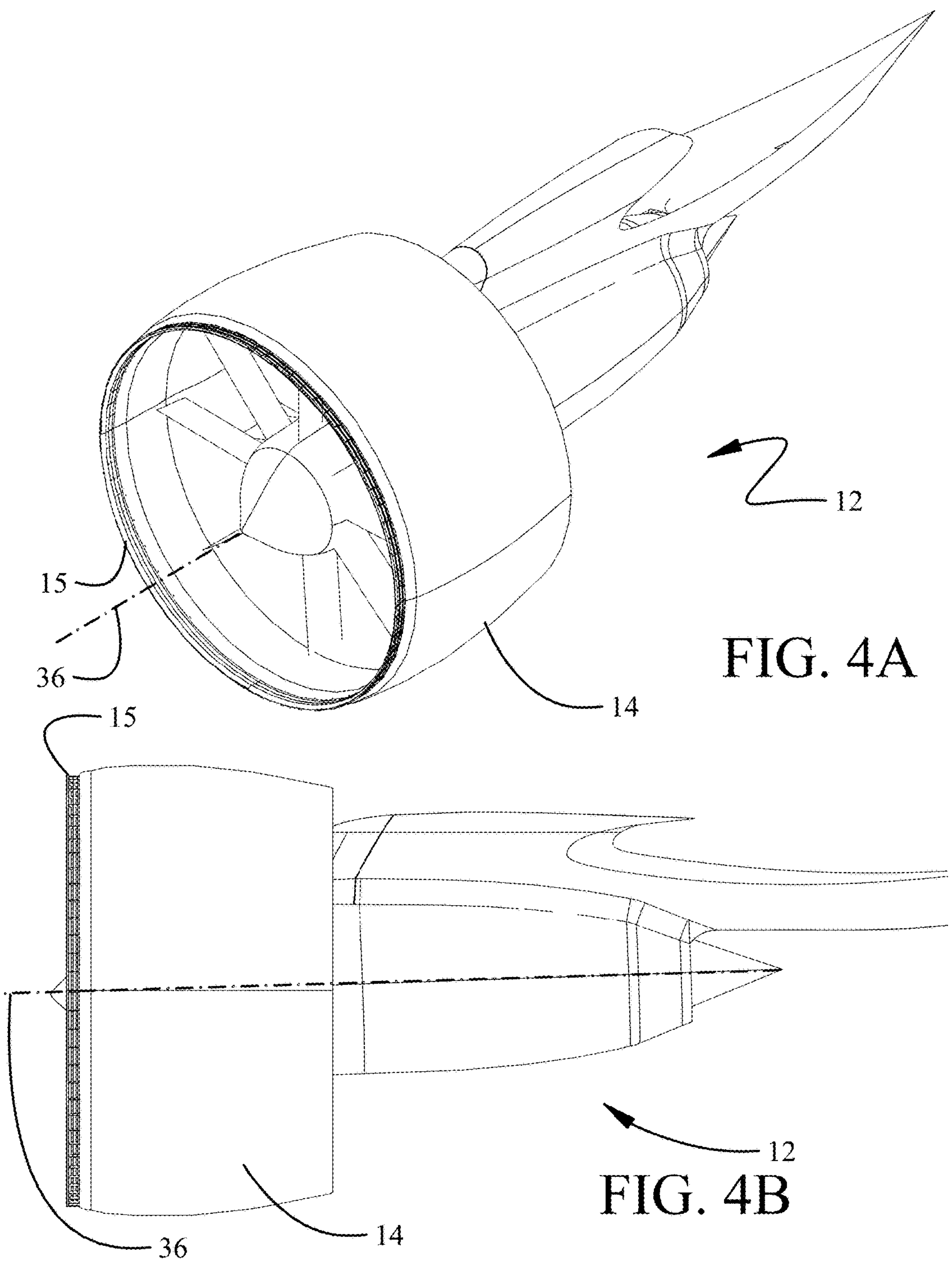
FIG. 4A is a front pictorial view of the nacelle and engine with the translating turning vanes segment in a partially deployed position.
FIG. 4B is a side view of the nacelle and engine with the cascade of translating turning vanes in a partially deployed position.
Figure 4C:
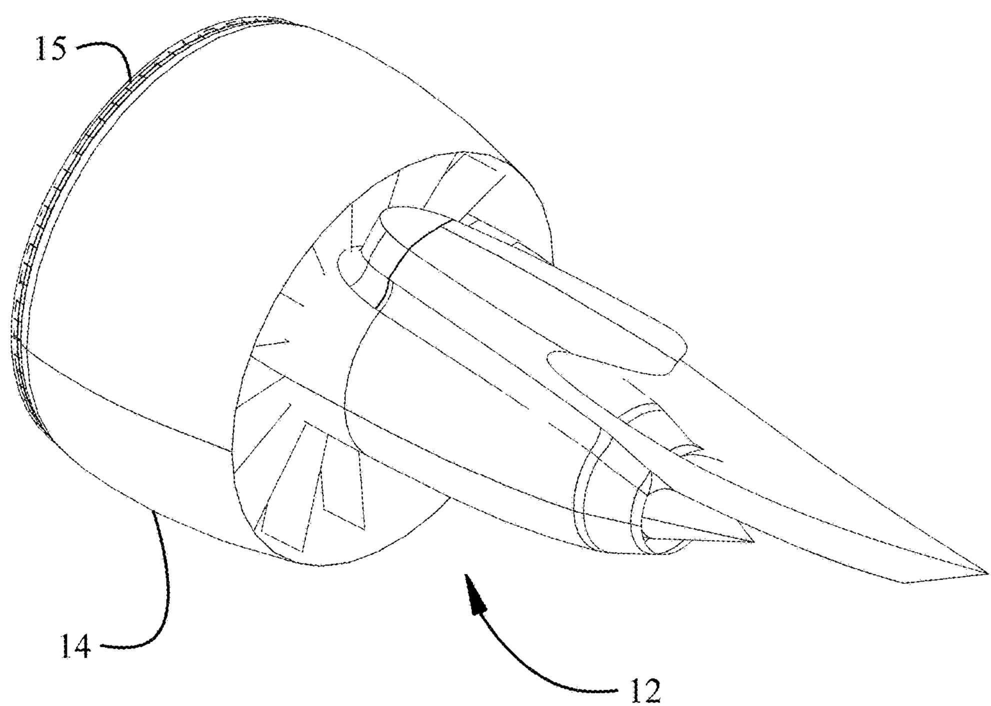
FIG. 4C is a rear pictorial view of the nacelle and engine with the cascade of translating turning vanes in a partially deployed position.
Figure 5A:
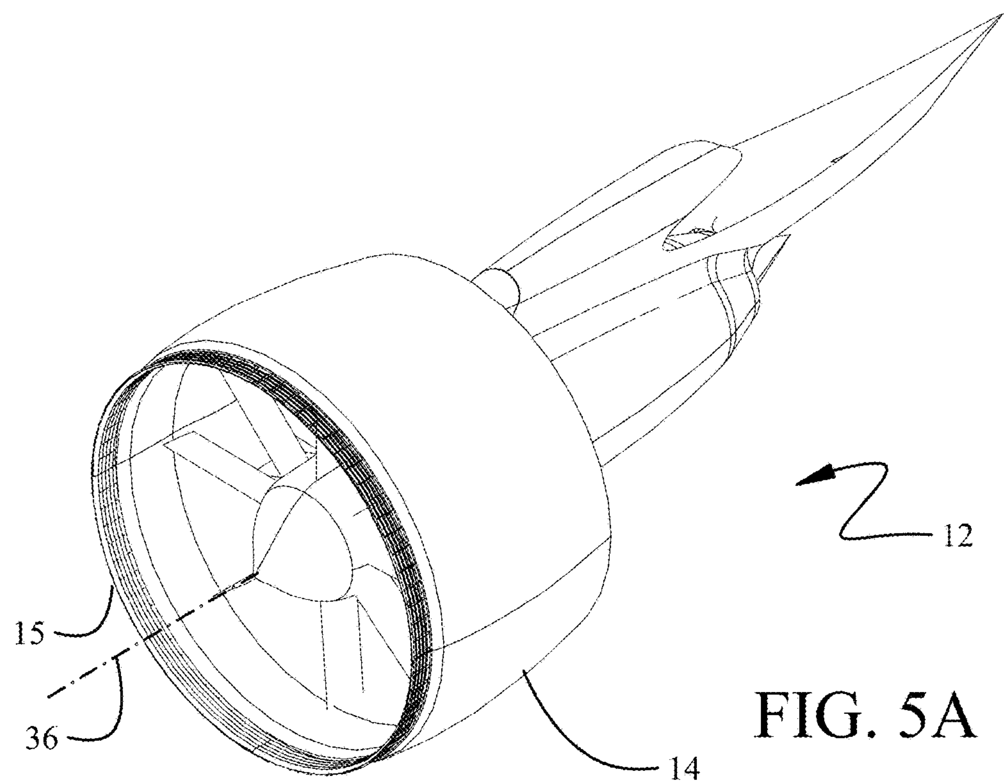
FIG. 5A is a front pictorial view of the inlet nacelle and engine with the cascade of translating turning vanes in a fully deployed position.
Figure 5B:
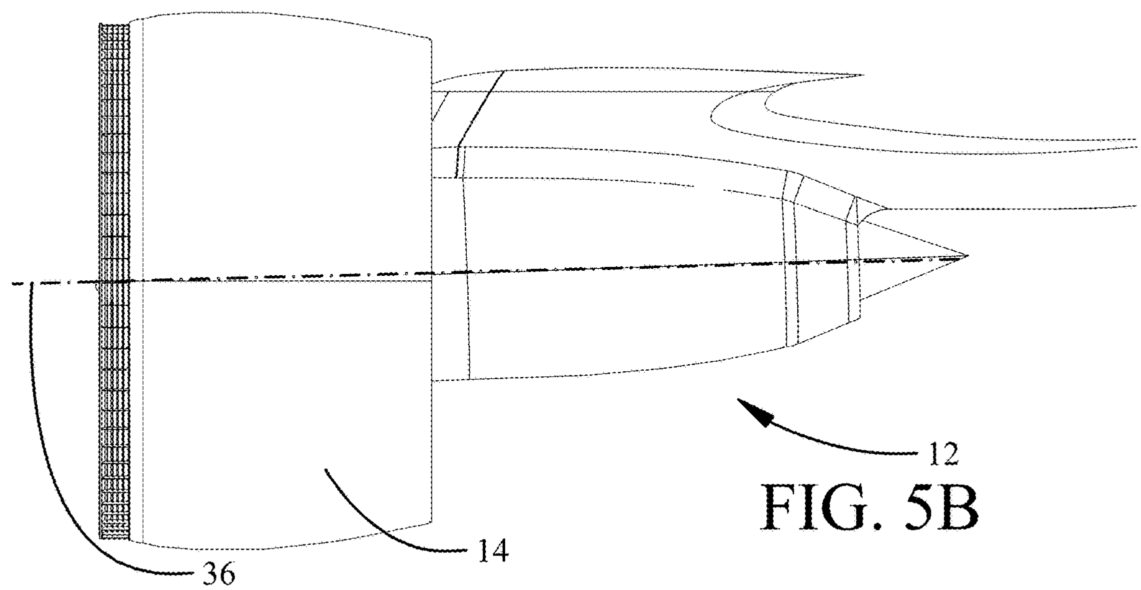
FIG. 5B is a side view of the nacelle and engine with the cascade of translating turning vanes in a fully deployed position.
Figure 5C:
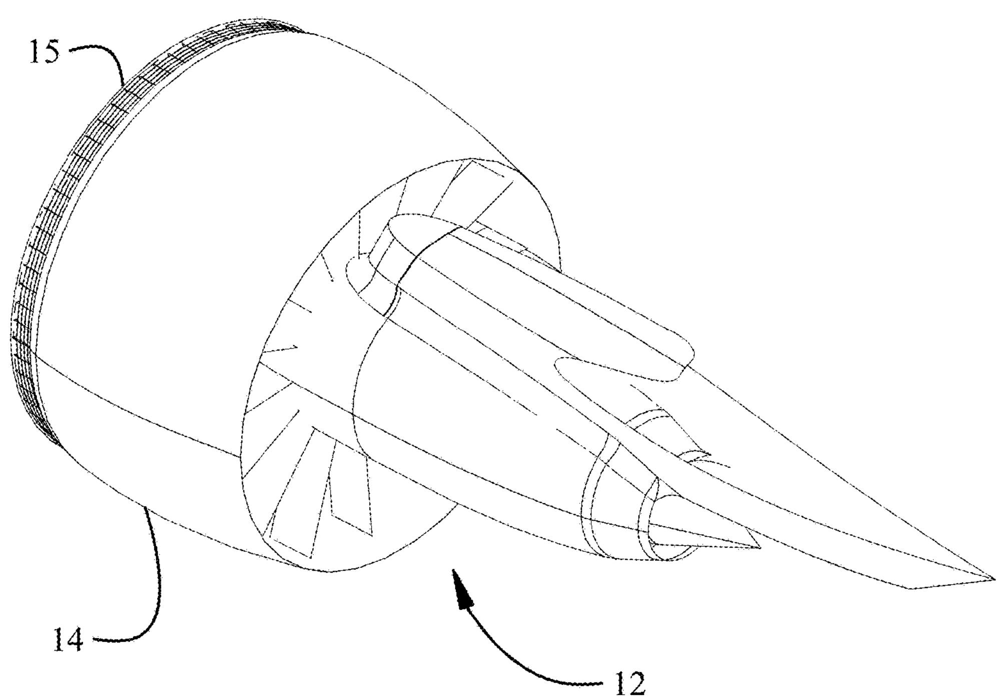
FIG. 5C is a rear pictorial view of the nacelle and engine with the cascade of translating turning vanes in a fully deployed position.

Deployment of the cascade of translating turning vane segments 16 is demonstrated in the sequence of drawings in FIGS. 3A-3C (closed or retracted), FIGS. 4A-4C (partially extended) and FIGS. 5A-5C (fully extended). Exemplary embodiments will typically be operated at either the stowed/retracted) or fully extended positions. However, in alternative embodiments, multiple partially extended positions may be employed, exposing differing numbers of vanes and slots to match aerodynamic operating requirements. As displayed in this sequence, extension of the entire radial cascade 15 of translating turning vane segments 16 is symmetrical about the nacelle inlet centerline 36.

Figure 4D:
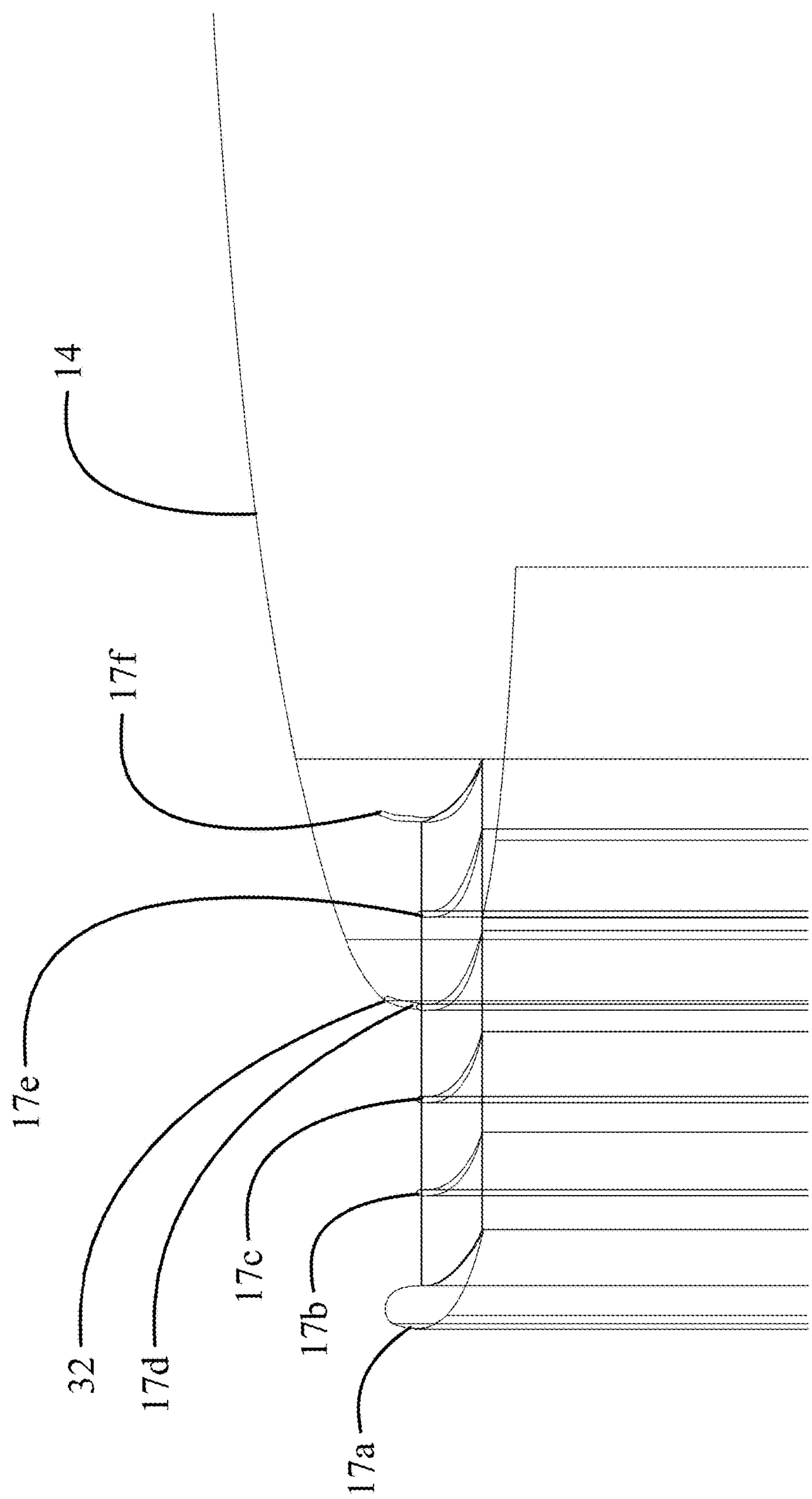
FIG. 4D is a detailed side section view showing features of the translating turning vanes segment in a partially deployed position.

As seen in FIG. 4D, the partially extended translating turning vane segment 16 provides an intermediate chord extension for the nacelle 14. Intermediate vane 17*d* has a contour comparable to the outer contour 21 of closing vane 17*f* to provide flow smoothing around and substantially close the slot 32 in the nacelle leading edge with the segment in the partially extended position.

Figure 6:
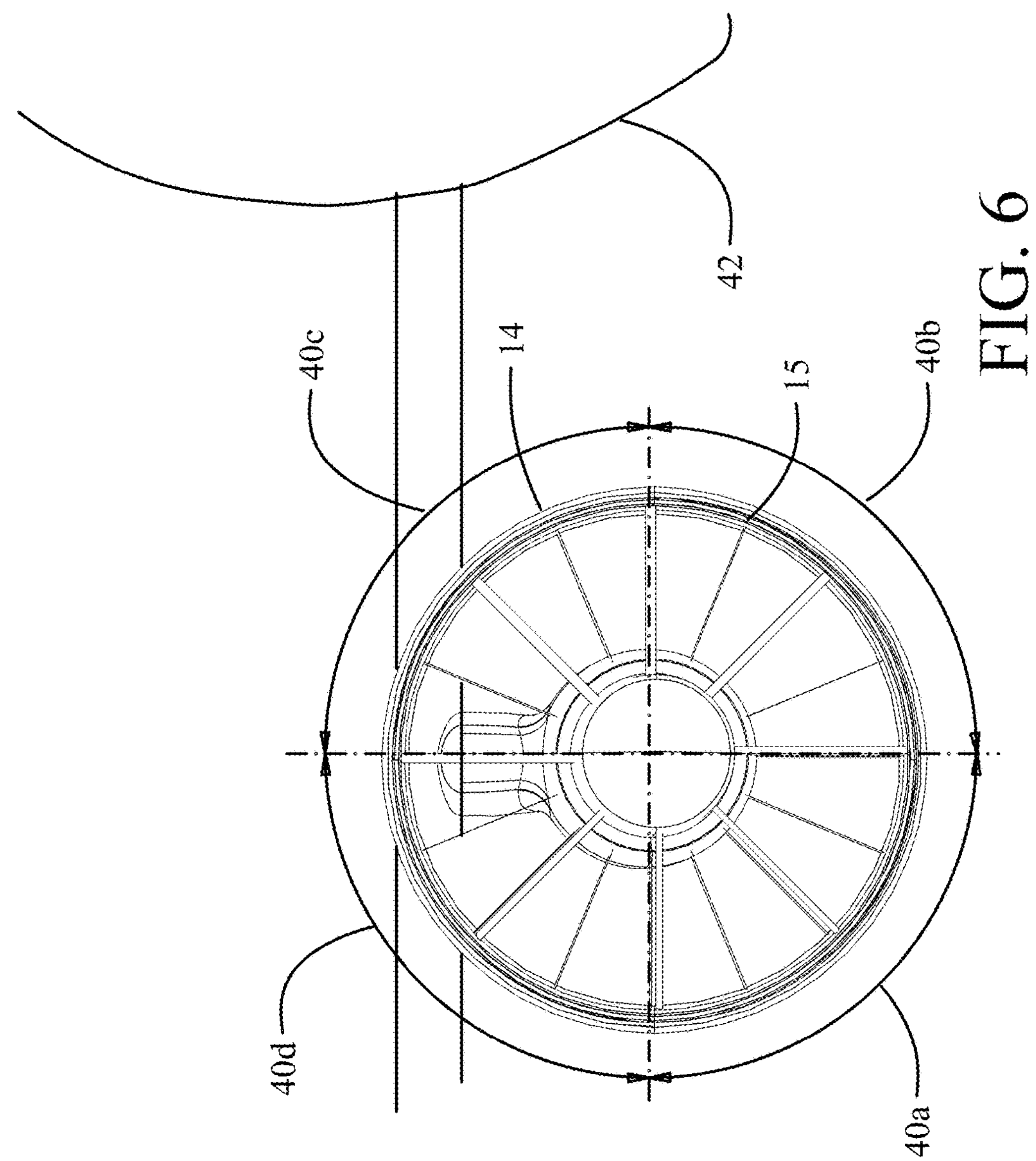
FIG. 6 is a front view of the turbofan engine as mounted on the wing adjacent the fuselage with the cascade of translating turning vanes in a fully deployed position.

FIG. 6 shows the symmetrical extended configuration of the radial cascade 15 of translating turning vane segments 16. As annotated in FIG. 6, quadrants 40*a*-40*d* around the nacelle may have differing aerodynamic conditions or effects created by angle of attack of the aircraft as a whole, cross winds, which may be partially shielded or mitigated by the fuselage 42 of the aircraft, or other aerodynamic phenomenon induced during flight, takeoff or landing of the aircraft. Each of the translating turning vane segments 16 may be separately operable for extension and retraction. For high angle of attack operation of the aircraft, deployment of selectable groups of the translating turning vane segments 16 in at least lower outboard and lower inboard quadrants 40*a* and 40*b* would likely be desirable. For a strong outboard cross wind from the right, R, of the aircraft (left on the drawings as a front view of the aircraft), deployment of the translating turning vane segments grouped in lower and upper outboard quadrants 40*a* and 40*d* would be desirable. Similarly, for a strong inboard cross wind from the left, L, of the aircraft (right on the drawing) deployment of the translating turning vane segments grouped in lower and upper inboard quadrants 40*b* and 40*c* may be desirable. However, presence of the fuselage 42 may block left cross wind flow and deployment of the translating turning vane segments in upper inboard quadrant 40*c* may not be required. The descriptions herein are reversed for left and right designations for an engine mounted on the left side of the aircraft. Additionally, while shown in the drawings as equal quadrants, the "quadrants" may be interpreted as any selected arcuate segments of the circumference of the inlet.

For aircraft with certain operating conditions or engine mounting configurations, the cascade of translating turning vane segments may be altered to include only active devices in lower quadrants 40*a* and 40*b*, or those quadrants plus a lower portion of quadrants 40*c* and 40*d* which would be sufficient to accommodate all needed aerodynamic conditions.

Figure 7:
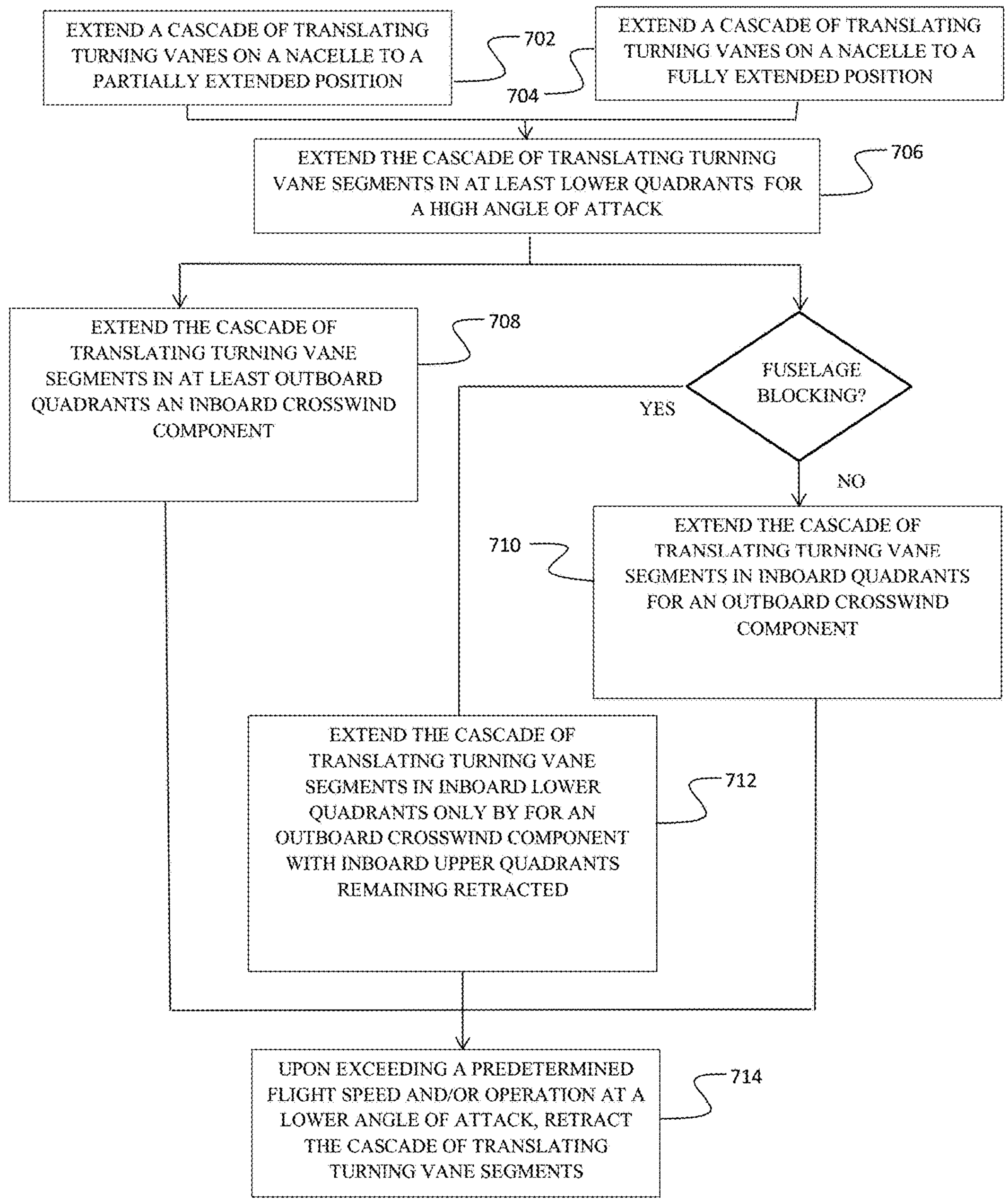
FIG. 7 is a flow chart depicting a method for flow control in a turbofan engine having a short inlet.

The embodiments disclosed herein provide a method for inlet flow control on an ultra-short turbofan engine nacelle as shown in FIG. 7. For a first predetermined aerodynamic condition, the cascade 15 of translating turning vane segments 16 may be extended to a partially extended position, step 702. For a second predetermined aerodynamic condition, the cascade 15 of translating turning vane segments 16 is fully extended, step 704. For an expected predetermined high angle of attack condition a plurality of translating turning vane segments 16 on each engine may be extended in at least lower quadrants 40*a*, 40*b* of the inlet circumference by extending the ribs of each translating turning vane segment through the leading edge 18 of the inlet, step 706. With a predetermined outboard cross wind component a plurality of translating turning vanes segments 16 may be extended in at least the outboard quadrants 40*a*, 40*d* of the inlet circumference, step 708. For a predetermined inboard cross wind component a plurality of translating turning vane segments 16 may be extended in at least the inboard quadrants 40*b*, 40*c* of the inlet circumference, step 710, or where fuselage blocking or mitigation of the inboard cross wind is anticipated, translating turning vane segments 16 in the upper inboard quadrant may remain retracted and only translating turning vanes segments 16 in the lower inboard quadrant are extended, step 712. Upon exceeding a predetermined flight speed and/or reducing operation to a lower angle of attack, all translating turning vane segments 16 are retracted, step 714.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A flow control system on an aircraft engine nacelle, the system comprising:

a cascade of translating turning vanes configured to extend from a leading edge of the nacelle; and at least one actuator coupled to translate the cascade of translating turning vanes from a retracted position to an extended position.

2. The flow control system as defined in claim 1 wherein the cascade of translating turning vanes are engaged by a plurality of longitudinal ribs forming translating turning vane segments.

3. The flow control system as defined in claim 1 wherein the cascade of translating turning vanes comprises between 2 and 10 vanes.

4. The flow control system as defined in claim 1 wherein the cascade of translating turning vanes includes a nose vane having an outer contour matching a contour of the leading edge of the nacelle.

5. The flow control system as defined in claim 1 wherein the cascade of translating turning vanes is translated through a slotted opening in the leading edge of the nacelle, the slotted opening having an outer edge located at or radially inward from a cruise condition stagnation point relative to a nacelle inlet centerline.

6. The flow control system as defined in claim 1 wherein the cascade of translating turning vanes includes a closing vane having an outer contour matching a contour of the leading edge of the nacelle, said closing vane being aligned with the outer contour when in the extended position.

7. The flow control system as defined in claim 1 wherein a length of the cascade of translating turning vanes in the extended position comprises between about 2.5% to 20% of a nacelle length.

8. The flow control system as defined in claim 2 wherein each translating turning vane segment of the cascade of translating turning vanes is separately translatable.

9. The flow control system as defined in claim 8 wherein the at least one actuator comprises a plurality of actuators engaged to translate associated translating turning vane segments.

10. The flow control system as defined in claim 9 wherein selectable groups of the translating turning vane segments are simultaneously extendible.

11. The flow control system as defined in claim 10 wherein at least one of the selectable groups is located in a lower quadrant of a circumference of a nacelle inlet, wherein the at least one of the selectable groups is adapted to accommodate a high angle of attack of the nacelle inlet.

12. The flow control system as defined in claim 10 wherein at least two of the selectable groups are located in outboard quadrants of a circumference of a nacelle inlet, wherein the at least two of the selectable groups are adapted to accommodate outboard crosswinds at the nacelle inlet.

13. The flow control system as defined in claim 10 wherein at least one of the selectable groups is located in an inboard quadrant of a circumference of a nacelle inlet, wherein the at least one of the selectable groups is adapted to accommodate inboard crosswinds at the nacelle inlet.

14. A method for inlet flow control on an engine nacelle comprising:

extending a cascade of translating turning vanes on the engine nacelle by translating the cascade through a slot in a leading edge of a nacelle inlet in at least one lower quadrant of a nacelle inlet circumference accommodating a high angle of attack of the engine nacelle.

15. The method of claim 14 further comprising extending a plurality of translating turning vane segments in at least one outboard quadrant of the nacelle inlet circumference accommodating a predetermined outboard wind component.

16. The method of claim 14 further comprising extending a plurality of translating turning vane segments in at least one inboard quadrant of the nacelle inlet circumference accommodating a predetermined inboard wind component.

17. The method of claim 14 further comprising extending a plurality of translating turning vane segments in a lower inboard quadrant of the nacelle inlet circumference accommodating a predetermined inboard wind component with a plurality of translating turning vane segments in an upper inboard quadrant remaining retracted.

18. The method of claim 14 further comprising retracting all translating turning vanes upon exceeding a predetermined speed or operation of the engine nacelle at a lower angle of attack.

19. An aircraft engine nacelle comprising:

a leading edge of a nacelle defining an inlet opening for air flow into an engine housed in the nacelle; and a flow control system located on the leading edge, the system comprising:

a cascade of translating turning vanes arranged about a circumference of the leading edge, the cascade of translating turning vanes being movable between a stowed position and an extended position in which the cascade of translating turning vanes extend forward from the leading edge of the nacelle; and at least one actuator coupled to translate the cascade of translating turning vanes between the stowed position and the extended position.

20. The aircraft engine nacelle of claim 19, wherein the cascade of translating turning vanes is housed in a recess formed in the nacelle when the cascade of translating turning vanes is moved to the stowed position.

* * * * *